United States Patent [19]

Layotte et al.

[11] Patent Number: 4,609,066
[45] Date of Patent: Sep. 2, 1986

[54] MIXED DEVICE FOR GENERATING LONGITUDINAL OR SHEAR WAVES

[75] Inventors: Pierre-Claude Layotte, Les Mathes; Jean Laurent, Orgeval; André James, Royan, all of France

[73] Assignees: Institut Francais du Petrole, Rueil-Malmaison; Compagnie Generale de Geophysique, Massy, both of France

[21] Appl. No.: 747,392

[22] Filed: Jun. 21, 1985

Related U.S. Application Data

[63] Continuation of Ser. No. 378,457, May 14, 1982, abandoned.

[30] Foreign Application Priority Data

May 14, 1981 [FR] France .................. 81 09813

[51] Int. Cl.⁴ .................................. G01V 1/04
[52] U.S. Cl. .................................. 181/121; 181/114
[58] Field of Search ............. 181/113, 114, 116, 119, 181/120, 121, 401; 367/75; 173/90, 94, 95, 98, 99, 101, 92, 93.5, 93.6, 93.7, 128

[56] References Cited

U.S. PATENT DOCUMENTS

4,244,437 1/1981 Fulkerson .................. 181/114
4,390,077 6/1983 Fulkerson .................. 181/114 X Primary Examiner—Charles T. Jordan
Assistant Examiner—Brian S. Steinberger
Attorney, Agent, or Firm—Millen & White

[57] ABSTRACT

A mixed device for successively generating in the earth, at the same location, longitudinal and shear waves is disclosed. The device comprises in association a target coupled to the earth surface and having a first striking face substantially parallel thereto and at least one second striking face substantially perpendicular to said first striking face. A guide tube is adapted to be positioned above the first striking face and perpendicularly thereto, and a movable weight is slidable in the guide tube and adapted to strike the first striking face. At least one hammer is articulated to a support rigidly secured to the guide tube and adapted to strike one second striking face of the target. Directional coupling means connect the guide tube to the target in such a manner that the weight sliding in the guide tube directly impinges the first striking face, but such that the guide tube is substantially released from the effect of the hammer impact on a second striking face.

15 Claims, 10 Drawing Figures

MIXED DEVICE FOR GENERATING LONGITUDINAL OR SHEAR WAVES

This application is a continuation of application Ser. No. 378,457, filed May 14, 1982 now abandoned.

BACKGROUND OF THE INVENTION

The present invention has for its object to provide a mixed device for generating longitudinal and transverse or shear waves, particularly adapted to land seismic prospecting.

In seismic prospecting, the location of the reflecting layers of the subsoil is determined by transmitting through the earth mainly longitudinal acoustic waves (P waves) which propagate according to the compression mode. In addition, there is also used transverse or shear waves (S waves) which propagate according to a distortion or shear mode. The shear waves have interesting applications since their wave length is, at equal frequency, lower than that of the longitudinal waves and they have a better resolving power. In addition, some of them (SH waves) have the particularity, in certain conditions, of being not subjected to any conversion in the presence of stratigraphic discontinuities and the recordings obtained from said waves are simpler.

The seismic prospecting methods comprising the combined transmission of longitudinal and shear waves permit obtaining a more precise knowledge of the subsoil but two separate seismic sources are necessary for their use, particularly sources specialized for generating one of these two waves types.

A known device adapted to generate acoustic shear waves is described for example, in the French patent No. 2,276,599 corresponding to U.S. Pat. No. 4,118,994. It essentially comprises a target member carried on a vehicle, which can be coupled to the ground intermittently, a weight for striking the target member and orientable movable driving means for laterally lifting the weight and orienting it fall towards the vertical lateral walls of the target member when the latter is in contact with the earth.

A known device adapted to generate acoustic longitudinal waves is described, for example, in the French patent No. 2,398,316 corresponding to U.S. Pat. No. 4,205,731. It essentially comprises a target secured at a first end of a guide tube and adapted to come in contact with the earth when the tube is substantially vertical, a weight freely slidable in the tube and adapted to impinge on the target, means for moving said weight up to an upper position at the second end of the tube and means for retaining it intermittently in said position. The means for moving the mass up to its upper position after each fall comprises, for example, a system integral with a rigid support for pivoting the tube between the vertical position of operation and a second position where the first end of the tube is above the opposite end.

A mixed device for successively generating in the earth, at the same location, longitudinal or shear waves in order to avoid the use of two separate seismic sources has been proposed in the U.S. Pat. No. 4,244,437. This device comprises a hoisting mast for displacing a weight with respect to a target member adapted, in vertical position, to generate longitudinal waves by striking vertically the target member and which may be inclined to the vertical so that the weight strikes a lateral face of the target member to generate shear waves.

This system however suffers from serious drawbacks. As a matter of fact, the force exerted in the direction of the target is reduced with respect to the gravity force of the weight, on the one hand by a factor corresponding to cos $\alpha$, $\alpha$ being the inclination angle of the hoisting mast to the vertical, and, on the other hand by the friction forces developed by the motion of the weight with respect to its guiding means on the hoisting mast.

Moreover, this force, exerted in the direction of the target is used only to a partial extent since only its horizontal component may generate shear waves, this horizontal component being derived from the force available in the direction of the target, by application of a coefficient equal to sin $\alpha$. Finally, the useful force for generating shear waves is at most equal to one half of the gravity force of the weight since $\cos \alpha \cdot \sin \alpha = \frac{1}{2} \sin 2\alpha$

SUMMARY OF THE INVENTION

The present invention has as an object to provide a mixed device for successively generating in the earth, at the same location, longitudinal and shear waves, which does not suffer from these drawbacks. It is essentially characterized by the association of separate means for generating respectively longitudinal and shear waves in a single unitary apparatus making use of a single target member, with the help of directional elastic coupling means whereby the guide member for the weight used to generate the longitudinal waves is to a large extent protected from the stresses generated, at the level of the target member associated therewith, by the lateral impacts for generating shear waves.

This device comprises at first weight, an elongate guide member for guiding the fall of said first weight along a direction substantially perpendicular to the surface of the earth, at least a second weight secured to one end of a supporting arm adapted to pivot about a rotation axle substantially parallel to the ground surface, driving means for lifting the first weight above the ground along said guide member, driving means for lifting the second weight by pivotation of the supporting arm about its rotation axle, and means for applying to the ground the impact force of said first or said second weight.

The device is remarkable in that the means for applying to the ground the impact force of the first or the second weight comprises a single target member provided with a ground coupling surface and at least one striking lateral surface and directional coupling means to connect the target member to the guide member, and in that the rotation axle of the supporting arm is carried by the guide member of the first weight.

The coupling directional means comprises, for example, an intermediary element placed between the end of the guide member and the target member, said intermediary element being fixed in translation with the target member and connected to the end of the guide member through elastic connection means, and further comprising an impact surface for the first weight.

BRIEF DISCUSSION OF THE DRAWINGS

Other characteristics and advantages of the device according to the invention will be made apparent from the following description of particular embodiments described as non-limitative examples and with reference to the accompanying drawings wherein.

DETAILED DESCRIPTION OF THE INVENTION

Figure 1:
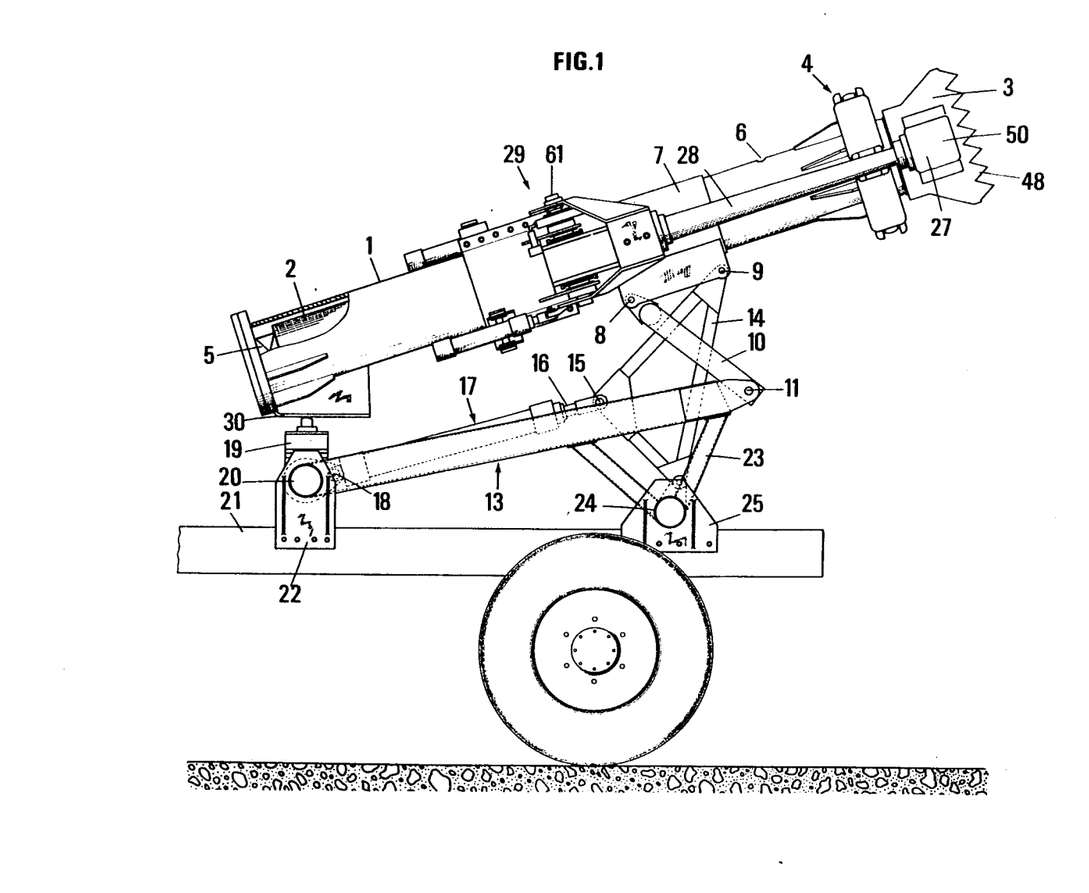
FIG. 1 diagrammatically shows an overall view of the device secured to a transportation vehicle, the guide member being in its second position and the second weights being maintained at the vicinity of the guide member by the supporting arms in position of close relationship.
Figure 2:
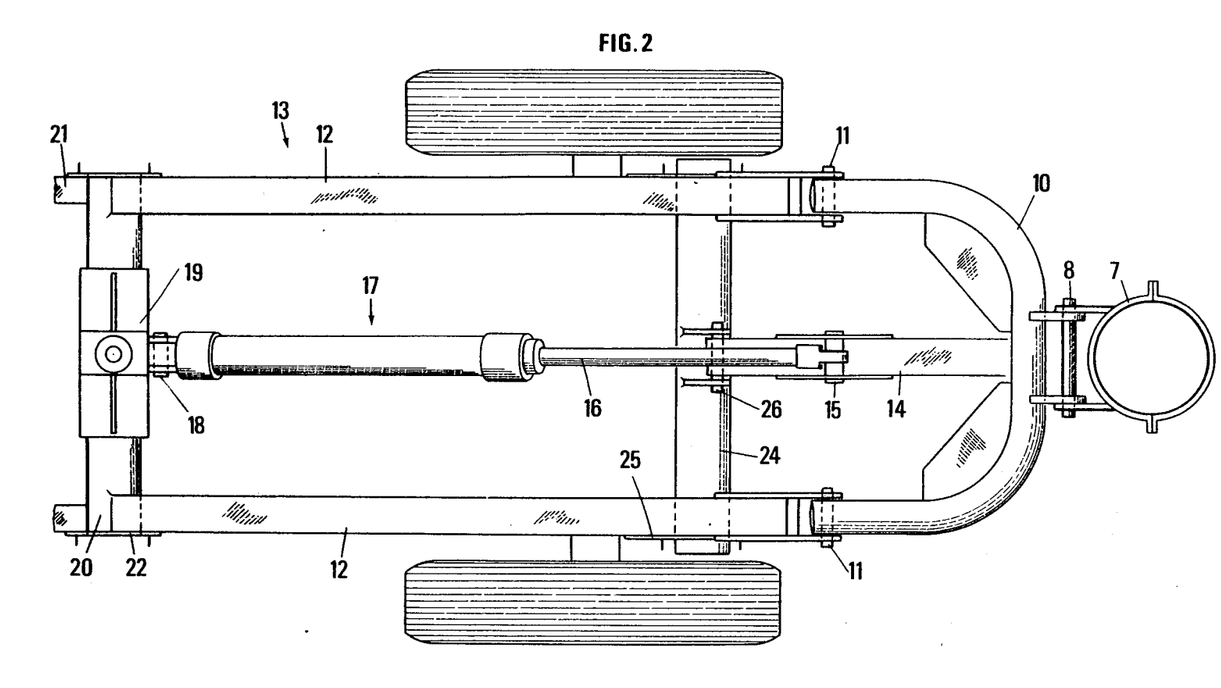
FIG. 2 diagrammatically shows a driving system with hydraulic jack for rotating a tubular sleeve used to support the guide member (not shown), the hydraulic jack being in a position of extension.

When referring to FIGS. 1 and 2, it can be seen that the guide member consists of a guide-tube 1 wherein may slide a first weight 2 whose upper part at least is metallic. The target member or single impact receiving member 3 is secured to the first end of the guide tube 1 through directional coupling means 4 shown more in detail in FIG. 3 and described later. At the opposite end of the guide tube (second end) are secured means 5 for intermittently retaining the first weight, comprising for example, an electro-magnet. An orifice 6 through the wall of the guide tube 1 establishes a communication at the lower part thereof with the exterior and provides for the free exhaust of the air expelled by the fall of the first weight 2 towards the target member 3. An identical orifice shown in FIG. 8, may also be provided at the vicinity of the other end of the guide tube.

Around the guide tube is secured a tubular sleeve 7 provided with housings for two axles 8 and 9. On axle 8 is articulated the median part of a first U-shaped driving arm 10 (FIG. 2). The two branches of the driving arm 10 may pivot at their ends about axles 11 secured to lateral beams 12 of an elongate rigid frame 13. On axle 9 is articulated a first apex of a second driving arm 14 of triangular shape. To a second apex of said driving arm 14 is rigidly secured an axle 15 about which the end of rod 16 of a jack 17 is pivotable. The body of the jack may itself pivot about an axle 18 carried by a support member 19 which is secured at the middle of a tubular cross beam 20 of the rigid frame 13. The beam 20 is secured to a chassis 21 through two lateral flanges 22. The chassis 21 may be that of a carrying vehicle for example. The two lateral beams 12 of the rigid frame 13 are secured at their other end, to two triangular support members 23 which are carried by a second tubular cross-beam 24 secured to chassis 21 through two lateral flanges 25. The third apex of the second driving arm 14 is adapted to pivot about an axle 26 (FIG. 2) carried by the second tubular cross beam 24. The assembly of elements 7 to 26 forms the driving means for hoisting the first weight above the ground.

The device also comprises a second weight 27 secured to a first end of a supporting arm 28, the other end of this arm being secured to driving means 29 adapted to rotate the one or more supporting arms 28 in a plane passing through the axis of the guide tube 1 and preferably, when the latter is in its first position, in a plane perpendicular to the longitudinal axis of the chassis 21 of the carrying vehicle. These driving means 29 which are secured to the guide tube will be described later with reference to FIG. 8 and to FIGS. 9 and 10. The guide tube 1 also comprises a plate 30 resting on the support member 19 secured to the rigid frame 13, when the tube is in its second position (position shown in FIG. 1).

Figure 3:
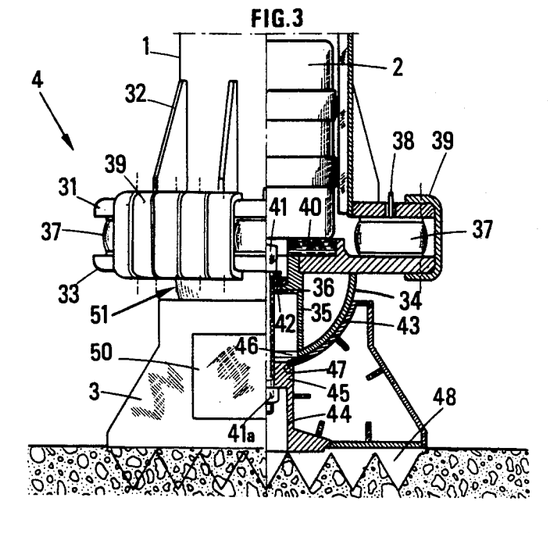
FIG. 3 diagrammatically shows, in partial cross-section along the axis of the guide member, the directional coupling means to connect the target member to the lower end of the guide member, which avoid the transmission to the latter of the lateral shocks produced by the fall of the one or more second weights on the target member, when it is applied against the ground surface (first position of the guide member)
Figure 4:
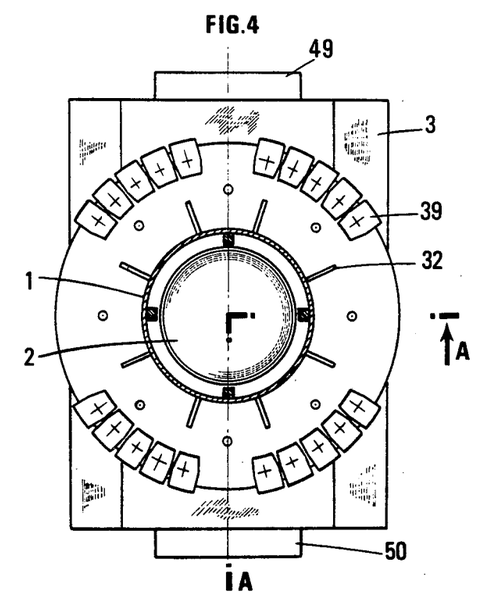
FIG. 4 diagrammatically shows a view from above of the lower part of the guide member connected to the target member through the coupling means shown in FIG. 3.

With reference to FIGS. 3 and 4, it can be seen that the directional coupling means whereby the target member or single impact receiving member 3 is connected to the guide tube 1, comprises:

a first base-plate 31 rigidly secured to the end of the guide tube 1 through reinforcing sheets 32;

an intermediary connection element 51 formed of a second base-plate 33, a semi-spherical part 34, secured under the second plate, a cylindrical member 35 open at both ends, one end of which bears on the outline of an opening 46 axially arranged in the semi-spherical part, the other end being recessed in the second plate 33, said cylindrical member being provided with an internal shoulder 36;

elastic means for connecting the intermediary element to the bottom of the guide tube, comprising:
 (a) pneumatic jacks with bellows 37 of a known type, each formed of two parallel discs tightly joined at their periphery through a deformable wall and whose pressure may be adjusted through inflation valves 38, said jacks, provided preferably in a number of four, being arranged between the base-plates 31, 33 and secured thereto, and
 (b) flexible straps 39 respectively secured to the two base-plates 31, 33 and regularly distributed about the periphery thereof;

a disc 40, placed in a housing of the second plate 33 in front of the tube end, which is struck by the first weight 2 at the end is disclosed. The device comprises of its fall; and a threaded rod 41 whose head bears against the inner shoulder of the cylindrical member 35, through a detachable ring 42 made of deformable material, said rod being associated to a nut 41a.

The target member 3 comprises, in its central part, a circular recess 43 against which bears the semi-spherical part 34 of the intermediary element, and a hollow cylindrical member 44 whose bottom 45 is recessed in a circular opening 47 arranged in the wall of the cavity 43 in front of the lower opening 46 of the other cylindrical member 35. The bottom 45 of the cylindrical member 44 is provided with a hole of a diameter adapted to that of the threaded rod 41. The length of the latter is greater than the distance between the shoulder 36 of the first cylindrical member 35 and the bottom 45 of the second cylindrical member 44. The nut 41a is screwed on the end of the threaded rod 41, so as to secure the target member 3 to the intermediary element. The cross-section of opening 46 at the bottom of the semi-spherical part is selected much larger than that of the threaded rod 41, so that the latter, through deformation of the ring 42, may be inclined on any side with respect to the axis of the guide tube 1, thereby enabling a relative rotation of the target member 3 with respect to the semi-spherical part 34 of the intermediary element, when the axis of the guide tube is not exactly perpendicular to the ground surface. By this arrangement the device can be adapted to the configuration of the land on which it is brought. The threaded rod 41 provided with its nut 41a and the deformable ring 42 form shiftable fixation means of the target member to the intermediary element.

Protruding members 48 (teeth or pins) are secured to the foot-piece of the target member 3 in order to improve the coupling thereof with the ground. In addition, two striking plates 49, 50 are secured to the two vertical opposite walls of the target member.

Figure 5:
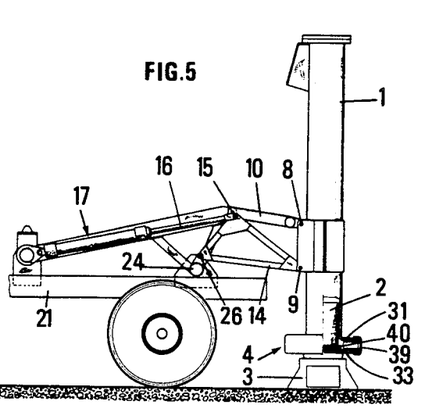
FIG. 5 diagrammatically shows the guide member in its first position (substantially vertical), the first weight having striken the target member and being in lower position.

The length of the driving arms 10 and 14 and their geometry are so selected that the guide tube 1 gets upright substantially to the vertical, from the position shown in FIG. 1, when the rod 16 of jack 17 is moved to its extented position (FIG. 5).

The portion of the generating device adapted to transmit longitudinal waves operates as follow.

The guide tube 1 being substantially in vertical position and the first weight 2 being in contact with the disc 40 of the intermediary element 51 (FIG. 5), the jack 17 is actuated so as to retract its rod 16 inside the jack body. The back motion of the rod 16 drives along the axle 15 and rotates the second triangular driving arm 14 about axle 26, carried by the second tubular cross beam 24. The axle 9 describes an arc of circle, having for effect to hoist the guide tube 1 above the ground. The rotation of the first driving arm 10, about the axle 11 secured to the rigid frame 12, has the effect of progressively inclining the guide tube 1 onto a vertical line. The assembly of the target member and of the intermediary element is maintained in its relative position with respect to the guide tube bottom by means of the assembly of straps 39 connecting the two base plates 31 and 33 along their whole outline. The combined rotation of the two driving arms 10 and 14 results as a whole in a rotation of the guide tube 1 to the position shown in FIG. 6. The position of the rigid frame 13 with respect to the chassis of the vehicle is adapted to the geometry of the driving arms 10, 14 in order that the end of the guide tube near the target member (first end) be above the opposite end when, the rod of jack 17 being in a retracted position, the plate 30 rests on the support member 19 secured to the tubular cross beam 20. By this way, the first weight 2 falls by gravity towards the lower end and comes in contact with the electro-magnet 5 which is then energized.

Figure 6:
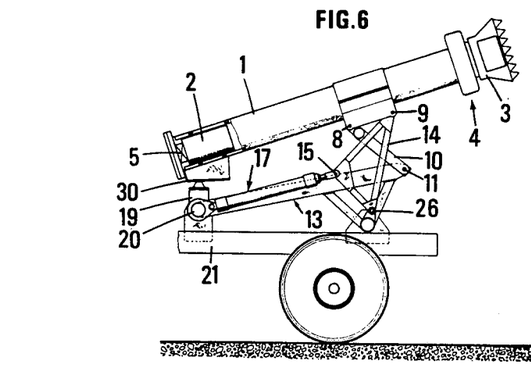
FIG. 6 diagrammatically shows the guide member rocked to its second position, the first weight having slid by gravity from the first end to the second end of the guide member.
Figure 7:
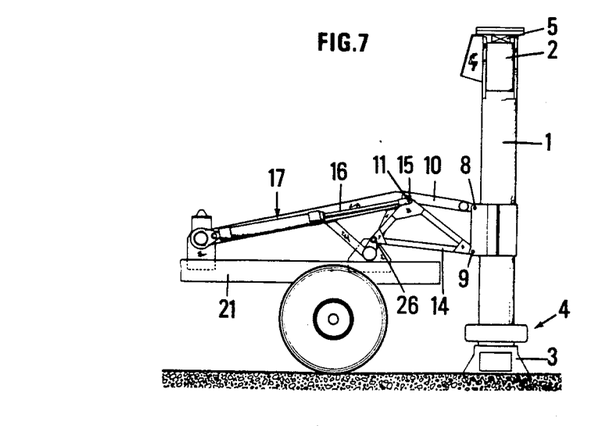
FIG. 7 diagrammatically shows the guide member set upright to its first position, the first weight being maintained at the second end of the guide member (upper end) through intermittently retaining means.

The device being in the position shown in FIG. 6, the jack 17 is actuated so as to push its rod 16 outside. The displacement of axle 5 rotates the two driving arms 10 and 14 about their respective axles 11 and 26 and the guide tube 1 gets upright to the position shown in FIG. 7 where the target member comes in contact with the ground. The first weight is maintained at the upper end.

The electric feeding of the electro-magnet is then discontinued and the first weight falls along the guide tube 1 and strikes the plate 40 (FIGS. 3 and 5) associated to the intermediary element 51 and to the target member. The shock generates compression waves or longitudinal waves which are transmitted to the ground.

Figure 8:
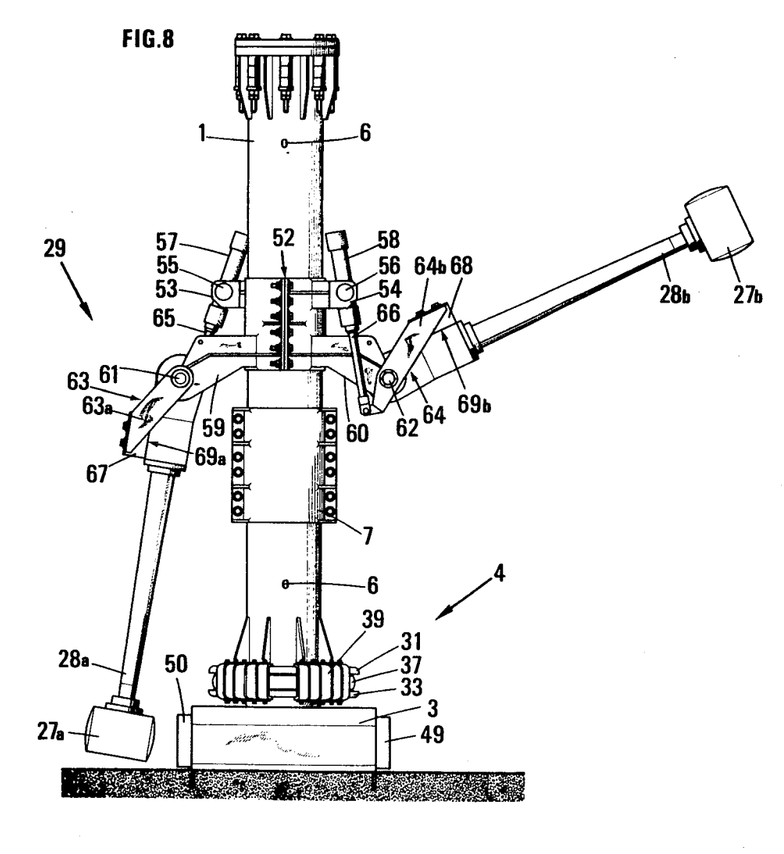
FIG. 8 diagrammatically shows a first embodiment of the device for generating acoustic shear waves comprising two supporting arms adapted to pivot by a predetermined angle with respect to the guide member, the driving means for hoisting the first weight by rotation of the guide member being not shown.

In FIG. 8, the guide tube 1 is shown in its first position in a plane perpendicular to the plane of FIG. 1, the driving system with hydraulic jack holding the tubular sleeve 7 and the carrying vehicle being not shown for sake of clarity.

The part of the device adapted to the transmission of shear waves comprises two second weights 27a and 27b secured to the ends of two supporting arms 28a, 28b. The driving means 29 comprises a clamp 52 rigidly secured around the guide tube 1 between the second end thereof and the tubular sleeve 7. The part of clamp 52 which is nearer to the second end of tube 1 comprises two radial extensions 53, 54 provided with housings for two axles 55, 56 about which may respectively pivot the bodies of two jacks 57, 58, for example, hydraulic jacks, symmetrically arranged with respect to the axis of the guide tube. The part of clamp 52 which is nearer to the tubular sleeve 7 comprises two bent lugs 59, 60 diametrically opposed with respect to the guide tube 1, and provided at the vicinity of their respective ends with housings for axles 61, 62 about which pivot respectively the supporting arms 28a, 28b of the second weights 27a, 27b. The driving means 29 comprises also two hoisting arms 63, 64 each provided with a housing for one of axles 61, 62 and each formed of two integral branches of unequal lengths, the shorter and the longer branches being respectively shown on FIG. 8 with references 63a, and 64b. At a certain distance from one of its ends, the longer branch of each driving arm 29 (e.g. 64b) is provided with means for its articulation to rod 65, 66 of one of the jacks 57, 58. At the opposite end of each hoisting arm 63, 64 is secured an intermittently retaining means consisting for example, of an electro-magnet 67, 68. The supporting arms 28a, 28b comprise metal surfaces 69a, 69b against which can be applied respectively the electro-magnets 67, 68, in any position of these supporting arms, by displacing the rods of jacks 65, 66, so as to rotate the hoisting arms 63, 64 about their axles 61, 62.

The driving means are so arranged that the common plane wherein move the second weights 27a, 27b will be perpendicular to the vertical or second striking surfaces 49, 50 provided on each side of the target member. The length of the supporting arms 28a, 28b, is of course so calculated that the second weights in their lower position be in contact with the striking surfaces.

By controlling the stroke of the rods of jacks 57 and 58, it is possible to give to the rotation angle of any one of the supporting arms 28a, 28b with respect to its lower position, any intermediate smaller value and accordingly, to select the potential power given to weights 27a, 27b. The term "upper position" will designate one of the positions corresponding to a selected spacing of arms 28a, 28b.

The part of the device for generating shear waves operates as follows:

At the selected location, the hydraulic jack 17 (cf. FIG. 1) is actuated until the guide tube be set upright in a vertical position and the target member be coupled to the ground through protruding elements 48.

The two supporting arms being in lower position (position of arm 28a shown in FIG. 8), one of the associated jacks 57, 58, is actuated so as to retract its rod 65, 66. The associated hoisting arm 63, 64, rotates about its axle 61, 62 to its lower position (position of the hoisting arm 63 as shown on the figure) at which the electro-magnet 67, 68, may come in application against the metal surface 69a, 69b of the supporting arm 28a, 28b in lower position.

The electro-magnet 67, 68 is then energized to secure the supporting arm 28a, 28b, to the corresponding lifting arm 63, 64.

The associated jack 57, 58, is then actuated so that its rod 65, 66 slides outwardly to its position of extension. The motion of the rod rotates the hoisting arm 63, 64 which drives the supporting arm 28a, 28b, secured thereto by the electro-magnet 67, 68, towards the selected upper position (for example, position of the arm 28b shown in FIG. 8).

At the triggering selected time, the electric supply of the precedingly energized electro-magnet 67, 68 is switched off. The corresponding supporting arm 28a or 28b being no longer held, rotates about its axle 61, 62 by action of its own weight and impinges the corresponding striking surface 49, 50. The target member 3 being coupled with the ground, the shock generates shear waves which can be used for seismic prospecting. The spacing apart of the two arms 28a, 28b may, of course, be simultaneous but preferably one of the supporting arms is maintained at the vicinity of its lower position during the operation of hoisting and triggering the other.

The directional coupling means connecting the target member 3 to the guide-tube 1 (FIGS. 3 and 8) operates as follows:

When one of the second weights 27a, 27b impinges, at the end of its fall, one of the striking plates 49, 50, the assembly of the target member 3 and the intermediary element 51, which is fast in translation therewith, receives a strong pulse. But this pulse is dampened to a very large extent by the deformation of the pneumatic jacks with bellows 37 and the guide tube 1 is substantially released from all the mechanical stresses applied to the target member parallely to the ground surface.

On the contrary, in a vertical direction, the coupling is direct since the first weight impinges directly the disc 40 of the intermediary element 51. The vertically oriented pulses are thus entirely applied to the ground without any dampening.

It is recalled that the straps 39 are used to maintain the assembly of the target member and the intermediary elements in position with respect to the bottom of the guide tube 1 when the latter is rocked to its second position (FIG. 1).

The use of two supporting arms 28a, 28b, arranged symmetrically with respect to the guide tube 1, and in a plane perpendicular to the striking surfaces 49, 50 of the target member, these two supporting arms being hoisted successively or simultaneously to the selected positions, makes it possible to quickly transmit to the ground, at the same location, a series of shear pulses, while changing at the time the direction of these shear pulses.

Figure 9:
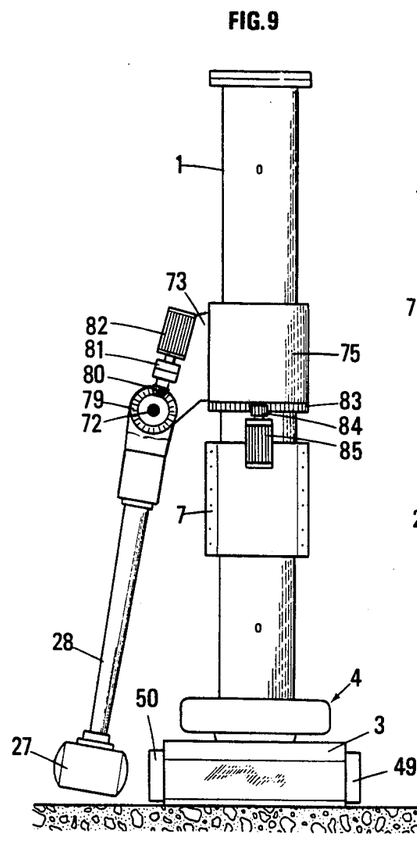
FIG. 9 diagrammatically shows a second embodiment of the device for generating acoustic shear waves comprising a single supporting arm, adapted to pivot with a rotary sleeve carried by the guide member, the driving means for hoisting the first weight by rotation of the guide member being not shown.
Figure 10:
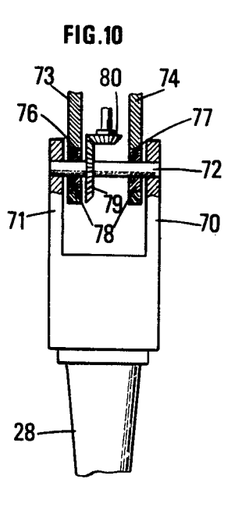
FIG. 10 shows in detail the arrangement of the end of the arm with respect to the rotary sleeve, in the embodiment of FIG. 9.

The second embodiment of the part of the device adapted to generate shear waves is shown in FIGS. 9 and 10 in the first position of the guide tube, the jack driving means connecting the tubular sleeve 7 to the chassis 21 being not shown. The device comprises a single weight 27 secured to a first end of a single supporting arm 28. The second end of the supporting arm consists of two branches 70, 71 (FIG. 10), each provided with a housing for the accommodation of a shaft 72. Fixation means, not shown, are provided to rigidly secure the supporting arm 28 to the shaft 72. Between the two branches 70, 71, are placed two thick plates 73, 74, at a distance from each other. These two plates are rigidly secured to a sleeve 75 mounted on ball bearings, conventional in the art and not shown, making them rotatable about the guide tube 1.

Openings 76, 77, are arranged through the two plates 73, 74, at the vicinity of their ends. Discs 78 of deformable material, e.g. polyurethane, are forced into the openings 76, 77. These discs are provided at their centers with holes for the accommodation of shaft 72. On the latter, between the two plates 73, 74, is secured a first bevel-gear 79 which meshes with a second bevel-gear 80 whose axle is connected to an electro magnet clutch 81 of a known type whereby the rotary motion of a motor 82, for example, of hydraulic type, associated to a reduction gear, is intermittently transmitted to the second bevel-gear 80.

To the sleeve 75 is secured a toothed crown 83, with which meshes a pinion 84 driven in rotation by a motor 85 secured to the guide tube 1. The motor 85 is, for example, of hydraulic type.

The embodiment shown in FIGS. 9 and 10, operates as follows:

The arm 28 being in lower position (as shown in FIG. 9), the hydraulic motor 82 is actuated and the electromagnetic clutch 81 is energized so as to drive the bevel-gears 79, 80 and the shaft 72 which then transmits its rotary motion to the supporting arm 28. The latter is hoisted apart from the vertical until it reaches an upper pre-determined position (e.g. at 120° to a vertical line).

The current feeding the clutch 81 is then switced off and the arm falls down to its lower position where the weight 27 impinges the striking surface 49 or 50, secured to the target member 3 and generates a shear pulse which is transmitted to the ground.

In order to subsequently apply a pulse in phase opposition with respect to the preceding one, the hydraulic motor 85 is actuated for driving pinion 84. The rotary motion of the latter is transmitted to the toothed crown 83 as well as to the sleeve 75 secured thereto, up to a position symmetrical of that shown in FIG. 9.

The sleeve 75 is secured in position and the arm is again hoisted up to its upper position and then triggered.

Similarly, it is possible to select at will the spacing angle of the supporting arm 28 so as to select the potential power imparted to the weight 27.

It would not be outside the scope of the invention to replace the transportation vehicle by a platform which may be displaced along a seismic profile, for example, by an helicopter.

As concerns the directional coupling means connecting the target member to the bottom of the guide member, the pneumatic jacks with bellows may be replaced by any other elastic connecting means and particularly, by deformable enclosures of any type.

In the described embodiment, the driving means for hoisting the first weight above the ground along the guide member, consists of means for rotating the guide member from the first position where the target member is in contact with the ground to a second position where the weight may slide by gravity from the first end to the second end of said guide member. It would not be either outside the scope of the invention to replace these driving means by any other system for hoisting the weight up to its upper position along the guide member maintained in its first position.

The protruding elements 48, formed of teeth or pins and adapted to improve the coupling of the target member with the ground, may also be replaced by any other equivalent means and, particularly, with a coupling member of flexible material (e.g. polyurethane) secured to the target member and whose lower surface is provided with asperities such as ridges or corrugations.

What is claimed is:

1. A unitary device for generating separately in the ground at a same site, but at different times, exclusively longitudinal acoustic waves and exclusively transverse acoustic waves by applying thereto impact forces oriented along a direction perpendicular to the ground surface for the longitudinal acoustic waves and along a direction parallel to the ground surface for transverse acoustic waves; the device including a first striking mass for falling toward the ground, an elongate guide member for guiding the fall of said first striking mass in a direction substantially perpendicular to the surface of the ground, at least one second striking mass secured to the end of a supporting arm adapted for pivoting about an axis of rotation which is substantially parallel to the ground surface, driving means for hoisting the second striking mass by pivoting the supporting arm about the axis of rotation, and a unitary impact receiving means having a coupling surface extending perpendicular to the elongate driving member for coupling with the ground to transmit to the ground the impact force of the first and the second striking masses, said impact receiving means including a first impact surface striking mass and at least one second impact surface extending perpendicular to the coupling surface for impact by the second striking mass, said device further including direction coupling means connecting the impact receiving means to the guide member for directly applying the impacts of the first striking mass to said first impact surface and for damping the transmission to said guide member of impacts on said second impact surface, and means on said guide member for mounting the axis of rotation of the arm supporting the second striking mass.

2. A device according to claim 1, wherein the directional coupling means comprises an intermediary element (51) located between the end of the guide member (1) and the impact receiving means (3), said intermediary element being fixed in translation with the impact receiving means and connected to the end of the guide member through elastic connecting means, and further having the impact surface for the first weight (2) thereon.

3. A device according to claim 1, wherein the elastic connection means comprises deformable straps (39) connecting the intermediary element to the end of the guide member and deformable enclosures interposed between the latter and said intermediary element.

4. A device according to claim 3, wherein the deformable enclosures consist of pneumatic jacks with bellows (37) whose ends are respectively secured to the end of the guide member and to the intermediary element.

5. A device according to claim 3, wherein the intermediary element comprises a semi-spherical part (34), the impacting receiving member comprises a cavity (43) of a shape adapted to said semi-spherical part and shiftable fixation means (41, 41A, 42) of the semi-spherical part against the cavity, enabling the rotation of the impact receiving member with respect to the intermediary element.

6. A device according to claim 3, wherein the guide member and the intermediary element respectively comprise a plate (31, 33), said plates beings separated by deformable enclosures and connected through straps, and wherein the impact surface for said first weight is a detachable disc (40) placed in a recess of plate (33) of the intermediary element.

7. A device according to claim 1 wherein the axis of rotation (61, 62) of the arm supporting the second weight (27) is carried by a clamp secured to the guide member and the means for hoisting the second weight by pivotation of the supporting arm comprises a jacks (57, 58) whose body is secured to the clamp and a hoisting arms (63, 64) adapted for pivoting about a rotation axle (61, 62) of the supporting arm (28) by action of the jack, and means rigidly secured to the hoisting arm for intermittently retaining the supporting arm.

8. A device according to claim 7, wherein the retaining means of the supporting arm comprises an electromagnet (67) and the pivotation angle of the hoisting arm is at least equal to the selected spacing angle between the supporting arm (28) and the target member (3).

9. A device according to claim 7, further comprising two second weights respectively secured to a first end of two supporting arms (28a, 28b) having axes of rotation symmetrical with respect to the axis of the supporting member.

10. A device according to claim 1, wherein the axis of rotation (72) of the arm (28) for supporting the second weight (27) is carried by a sleeve (75) adapted for rotating about the support member and the means for hoisting the second weight by pivoting of the supporting arm comprises motor means adapted for intermittently driving the rotation axle of the supporting arm and a driving system for rotating the sleeve (75) with respect to guide member (1).

11. A device according to claim 10, wherein two dampening discs (78) are arranged between the axis of rotation of the supporting arm and two plates (73, 74) rigidly secured to sleeve (75), said motor means comprises a motor (82) coupled with an electro-magnetic clutch (81) and bevel-gears (79,80) for transmitting the motor motion to the rotation axle of the supporting arm, and the driving system for rotating the sleeve (75) comprises a toothed crown (83) rigidly secured to sleeve and a motor (85) secured to the guide member and associated with a pinion (84) for rotating said toothed crown.

12. A device according to claim 1, wherein the coupling surface of the impact receiving means has protruding elements (48) for facilitating the coupling thereof to the ground.

13. A device according to claim 1, wherein the coupling surface of the impact receiving means during operation rests on the ground through a flexible carpet having a lower surface provided with asperities.

14. A device for generating separately in the ground, at a same site but at different times, exclusively longitudinal acoustic waves and exclusively transverse acoustic waves by applying thereto impact forces oriented along a direction perpendicular to the ground surface for the longitudinal acoustic waves and along a direction parallel to the ground surface for transverse acoustic waves; the device including a first striking mass for falling toward the ground, an elongate guide member for guiding the fall of said striking mass in a direction substantially perpendicular to the surface of the ground, at least one second striking mass secured to the end of a supporting arm adapted for pivoting about an axis of rotation which is substantially parallel to the ground surface, driving means for hoisting the second striking mass by pivoting the supporting arm about the axis of rotation, and single impact receiving means having a coupling surface extending perpendicular to the elongate driving member for coupling with the ground to transmit to the ground the impact force of the first and the second striking masses, said impact receiving means including a first impact surface parallel to the extent of the coupling surface for impact by the first striking mass and at least one second impact surface perpendicular to the coupling surface for impact by the second striking mass, said device further including direction coupling means connecting the impact receiving means to the guide member for directly applying the impacts of the first striking mass to said first impact surface and for damping the transmission to said guide member of impacts on said second impact surface, wherein said directional coupling means comprises an intermediary element (51) located between the end of the vertical guide member (1) and the impact receiving means (3), said intermediary element being provided with the second surface for impact by the first striking mass, said intermediary element being fixed in translation with the impact receiving means and being connected to the end of the guide member by elastic connecting members comprising deformable straps connecting the intermediary element to the end of the guide member, and deformable enclosures being interposed between the end of the guide member and said intermediary element.

15. A device for generating alternatively in the ground both longitudinal and transverse acoustic waves, the device comprising: a first striking mass adapted to fall toward the ground; an elongate guide member for guiding the fall of said first striking mass in a direction substantially perpendicular to the surface to the ground; two second striking masses; two arm members, each having one of the second striking masses attached thereto; a clamp secured to the guide member; an axle coupling each of the arms to the clamp, each of the axles extending substantially horizontally with respect to the ground when the device is generating waves, wherein the arm members each swing in an arc about the respective axle; a hoisting arm secured to each arm for rotation therewith; two jacks, each attached at one end to one of the hoisting arms and at the other end to the clamp; and single impact receiving means having a coupling surface extending perpendicular to the elongate driving member for coupling with the ground to transmit to the ground the impact force of the first and the second striking masses, said single impact receiving means including a first impact surface parallel to the extent of the coupling surface for impact by the first striking mass and at least one second impact surface perpendicular to the coupling surface for impact by the second striking masses; and direction coupling means connecting the impact receiving means to the guide member for directly applying the impacts of the first striking mass to said first impact surface and for damping the transmission to said guide member of impacts on said second impact surface.

* * * * *